United States Patent
Hirabayashi

(10) Patent No.: US 6,952,202 B2
(45) Date of Patent: Oct. 4, 2005

(54) APPARATUS FOR INPUTTING COORDINATES

(75) Inventor: Takeshi Hirabayashi, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 611 days.

(21) Appl. No.: 09/764,264

(22) Filed: Jan. 19, 2001

(65) Prior Publication Data
US 2001/0022579 A1 Sep. 20, 2001

(30) Foreign Application Priority Data
Mar. 16, 2000 (JP) ................................ 2000-074260

(51) Int. Cl.$^7$ ................................................ G09G 5/00
(52) U.S. Cl. ...................... 345/175; 345/173; 345/174; 345/176; 345/177; 345/179; 345/183; 178/18.1; 178/19.1
(58) Field of Search ........................... 345/173, 174, 345/175, 176, 177, 179, 183, 156, 170, 178; 178/18.1, 19.1, 18.01, 18.09, 18.61, 19.03, 19.05

(56) References Cited

U.S. PATENT DOCUMENTS

| | | | | |
|---|---|---|---|---|
| 4,205,304 A | * | 5/1980 | Moore | 341/5 |
| 4,751,379 A | * | 6/1988 | Sasaki et al. | 250/221 |
| 4,855,590 A | * | 8/1989 | Bures et al. | 250/221 |
| 4,936,683 A | * | 6/1990 | Purcell | 356/152.2 |
| 5,577,733 A | * | 11/1996 | Downing | 273/348 |
| 5,988,645 A | * | 11/1999 | Downing | 250/222.2 |
| 6,100,538 A | * | 8/2000 | Ogawa | 178/18.09 |
| 6,285,359 B1 | * | 9/2001 | Ogasawara et al. | 178/18.09 |
| 6,335,724 B1 | * | 1/2002 | Takekawa et al. | 345/173 |
| 6,362,468 B1 | * | 3/2002 | Murakami et al. | 250/221 |
| 6,449,041 B1 | * | 9/2002 | Jung et al. | 356/326 |

* cited by examiner

Primary Examiner—Bipin Shalwala
Assistant Examiner—Vincent E. Kovalick
(74) Attorney, Agent, or Firm—Oblon Spivak, McClelland, Maier & Neustadt, P.C.

(57) ABSTRACT

The apparatus for inputting coordinates has a support plate including a coordinate input plane for inputting a coordinate position, an optical unit is formed by integrating a light source and a light receiver. The light source emits light which is substantially parallel to the coordinate input plane. A reflecting section reflects the light emitted from the light source. The optical unit is embedded in the coordinate input plate by the use of a frame, an optical unit retaining plate and a screw.

22 Claims, 16 Drawing Sheets

REFLECTOR SHEET

APPARATUS FOR INPUTTING COORDINATES

FIELD OF THE INVENTION

The present invention in general relates to an apparatus for inputting coordinates. More particularly, this invention relates to an optical type apparatus for inputting coordinates which determines coordinates of a position by detecting a direction in which an emitted light is shielded or reflected.

BACKGROUND OF THE INVENTION

A conventional optical type apparatus for inputting coordinates includes an optical unit which is constructed in such a manner that a light emitting section and a light receiving section are integrally formed. The apparatus for inputting coordinates determines the coordinates of a position by sensing shielding of light due to a pointing means such as a stick, finger or the like, or by sensing light reflected by a reflecting member attached to the pointing stick.

FIG. 12A and FIG. 12B schematically shows a corner portion including the optical unit of a conventional apparatus for inputting coordinates. FIG. 12A is a perspective view showing the apparatus for inputting coordinates, and FIG. 12B is a front view when viewing the optical unit from a light emitting plane. A apparatus for inputting coordinates 1100 is composed of a coordinate input plane 1101 for inputting a coordinate position, an optical unit 1102, a reflecting section 1103, a support plate 1104 for fixing the coordinate input plane 1101, and a frame section 1105 for reinforcing the support plate 1104 and fixing the reflecting section 1103. More specifically, the optical unit 1102 has a light emitting section which emits light that is substantially parallel to the coordinate input plane 1101 and a light receiving section which receives the light traveling substantially parallel to the coordinate input plane 1101. The reflecting section 1103 reflects the light emitted from the optical unit 1102 to the identical direction.

In FIG. 12A, legend 1106 denotes an emission light port which is an outlet of light from the optical unit 1102, and legend 1107 denotes a screw for fixing the optical unit 1102 to the frame section 1105. Moreover, legend 1108 denotes a pointing stick and a finger for inputting a coordinate position (coordinate point) on the coordinate input plane 1101. In this case, for example, the pointing stick 1108 may be a finger as shown in FIG. 12A, and not a specific stick. The emission light port 1106 is also an incident light port which is an inlet of light incident upon the optical unit 1102. the light receiving section 401 is arranged on a position receiving the light traveling substantially parallel to the coordinate input plane 101. However, the light emitting section 301 and the light receiving section 401 are not limited to the arrangement as described above. For example, as shown in FIG. 8A and FIG. 8B, either of the light emitting section 301 and the light receiving section 401 may be arranged below the apparatus for inputting coordinates. By doing so, it is possible to reduce irregularities on the surface of the apparatus for inputting coordinates 100, and thus, to improve a user's operability.

The following is a description on an apparatus for inputting coordinates of this second embodiment, which calculates a coordinate point by sensing a direction of irradiation light reflected by the pointing stick. In this second embodiment, identical legends are used to designate the same constituent parts as the above first embodiment and the details are omitted. FIG. 9A and FIG. 9B are views schematically showing a corner portion including an optical unit of the apparatus for inputting coordinates which senses a direction of irradiation light reflected by the pointing stick. FIG. 9A is a perspective view of the apparatus for inputting coordinates, and FIG. 9B is a front view showing the optical unit when viewing it from a light emitting side.

A apparatus for inputting coordinates 800 is composed retro-reflector for reflecting a probe light from the optical unit to the direction identical with an incident direction.

The apparatus for inputting coordinates 1200 irradiates a beam probe light from a light emitting section (not shown) of the optical unit 1202, and then, senses a direction of light reflected by the retro-reflection member of the pointing stick 1208 by a light receiving section (not shown) of the optical unit 1202, and thereby, detects a coordinate position of the pointing stick 1208.

In the conventional cases of irradiating a sector-shaped light so as to detect a shielding direction and irradiating a beam probe light so as to detect a reflecting direction, the optical unit is integrally formed, and thereby, it is possible to improve an availability of the apparatus for inputting coordinates. More specifically, the light emitting section and the light receiving section are made into a unit; therefore, there is no need of making a fine adjustment of an optical system included in the unit, and it is possible to accurately detect a direction (or position) by the pointing stick or the like.

However, the prior art has the following problems. More specifically, the conventional apparatus for inputting coordinates is constructed in a manner that the optical unit is merely attached to an upper portion of the coordinate input plane. For this reason, there is the case where the optical unit hinders the coordinate input; as a result, an operability is reduced.

Moreover, the conventional apparatus for inputting coordinates has the following problem that a detection accuracy is reduced in a specific area on the coordinate. FIG. 14A and FIG. 14B are views showing the area where the detection accuracy is reduced, and to explain the principle. As shown in FIG. 14A, in a lower portion of the coordinate input plane 1301, the detection accuracy on a left-side optical unit 1302L is taken into consideration. In this case, it is assumed that a right-side optical unit 1302R senses shielding by pointing means such as a finger in linear one direction.

Further, as shown in FIG. 14B, in the case where the pointing means 1303 vertically indicates the coordinate plane 1301, the indicated position and a position shielding the irradiation light coincident with each other. On the other hand, as shown in FIG. 14C, in the case where the pointing means 1303 obliquely indicates the coordinate input plane 1301, the indicated position (coordinate point) and a position shielding the irradiation light do not coincident with each other.

The pointing means 1303 is tilted, and as shown in FIG. 14A, the actual indicated position on the coordinate input plane 1301 is p, and a position of light shielding by the pointing means 1303 is p'; in this case, a coordinate point is calculated as being q. However, in such a case, p and q are adjacent to each other; therefore, an error is very minute. On the other hand, the actual indicated position on the coordinate input plane 1301 by the pointing means 1303 is r, and a position shielded by the pointing means 1303 is r'; in this case, a coordinate point is calculated as being s. Therefore, an error considerably becomes large; for this reason, the detection accuracy is reduced in a predetermined area on the coordinate input plane 1301.

If the light irradiated from the optical unit 1302 is far from the coordinate input plane 1101, there is a problem that "unnecessary brush script" (called as "hane" in calligraphy serif" or "faintness" occurs in a locus drawn by the pointing means displayed on a display screen. FIG. 15A and FIG. 15B are views to explain the principle that the "unnecessary brush script" occurs, and FIG. 16A to FIG. 16F are views to explain the principle that the "faintness" occurs. As is evident from FIG. 15A, when light position is far from the coordinate input plane 1101, the irradiation light is shielded until a finger contacts with the coordinate input plane 1101; for this reason, as shown in FIG. 15B, the "unnecessary brush script" occurs in starting or ending the input.

Moreover, as shown in FIG. 16A to FIG. 16F, the finger all shields lights to be shielded until it contacts with the coordinate input plane 1101, for this reason, the "faintness" occurs because it is difficult to set a detection threshold value.

In the prior art, in order to widen the coordinate input plane, sometimes two or more apparatuses for inputting coordinates are connected for performing a coordinate input. For this reason, there is a problem that a visibility becomes worse because the reflecting plate or the shielding plate on a joined portion becomes an obstacle depending upon viewing positions. More specifically, following problem arises when a plurality of apparatuses for inputting coordinates are used. For example, at a conference hall, in the case of attending a lecture from various positions, the reflecting plate or the shielding plate becomes an obstacle from listeners who are positioned at a low angle with respect to the coordinate input plane; for this reason, the visibility becomes worse.

SUMMARY OF THE INVENTION

It is an object of the present invention to provide an apparatus for inputting coordinates which is easy to operate. It is another object of the present invention to provide an apparatus for inputting coordinates which can detect the coordinates accurately. It is still another object of the present invention to provide an apparatus for inputting coordinates which can improve a visibility.

In the apparatus for inputting coordinates according to one aspect of the present invention, alight source section and a light receiving section are integrated to form one optical unit, and this optical unit is embedded in a coordinate input plate. As a result, it become possible to reduce a projection of the optical unit.

Further, height of the light, from the coordinate input plane, emitted by the light source is adjustable. Further, the height of the reflecting section, from the coordinate input plane, is adjustable. Further, this apparatus for inputting coordinates can be coupled another apparatus for inputting coordinates. Further, a plane including the coordinate input plane is interposed between the light source section the light receiving section.

In the apparatus for inputting coordinates according to another aspect of the present invention, a pointing stick reflects the light. Furthermore, a light source section and a light receiving section are integrated to form one optical unit, and this optical unit is embedded in a coordinate input plate. As a result, it becomes possible to reduce a projection of the optical unit.

Further, an outlet of light with respect to the coordinate input plane, i.e. the emission light mouth, is provided with a shielding plate substantially parallel to the coordinate input plane. Further, height of the light, from the coordinate input plane, emitted by the light source is adjustable. Further, a shielding plate extending substantially vertical to the coordinate input plane at an outer edge of the coordinate input plane is provided. Further, height of the shielding plate, from the coordinate input plane, is adjustable. Further, the apparatus for inputting coordinates can be coupled with another apparatus for inputting coordinates.

Other objects and features of this invention will become apparent from the following description with reference to the accompanying drawings.

DESCRIPTION OF THE PREFERRED EMBODIMENTS

Preferred embodiments of the present invention will be described below with reference to the accompanying drawings.

Figure 1A:
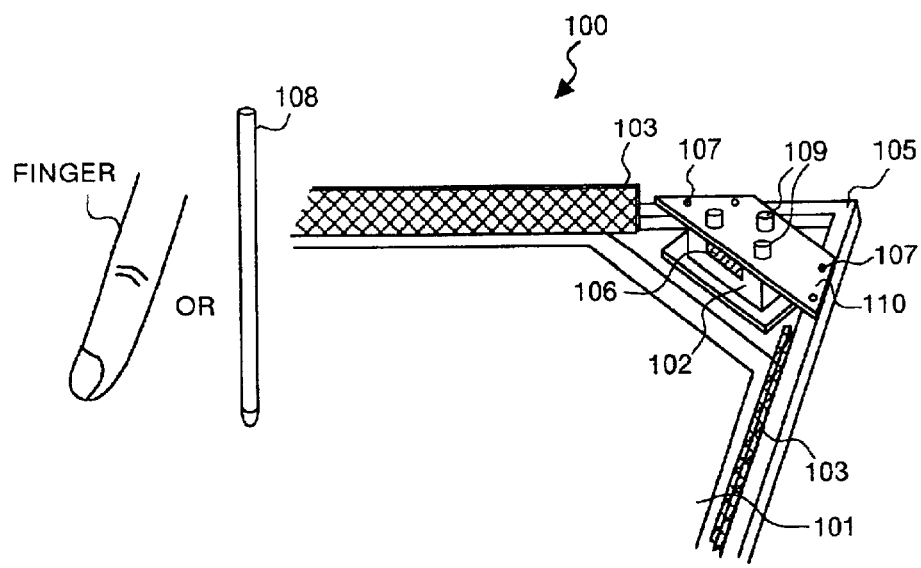
FIG. 1 is a view schematically showing a corner portion including an optical unit of an apparatus for inputting coordinates of the present invention.
Figure 1B:
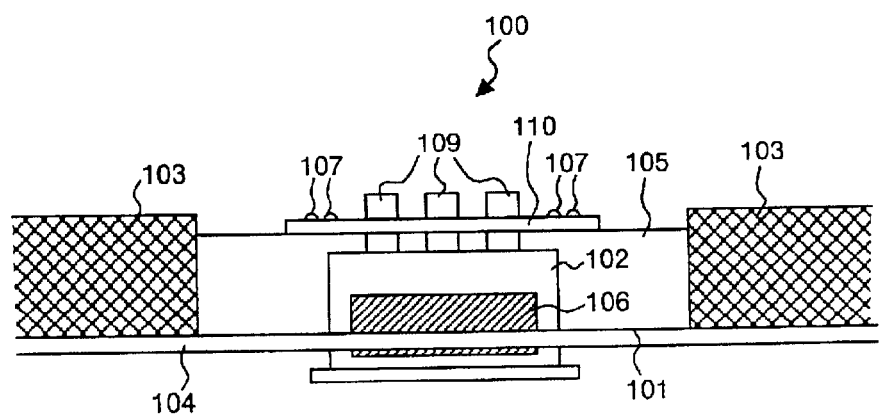

FIG. 1A and FIG. 1B are views schematically showing a corner portion including an optical unit of an apparatus for inputting coordinates of the present invention. FIG. 1A is a perspective view showing the apparatus for inputting coordinates, and FIG. 1B is a front view when viewing the optical unit from a light emitting plane. A corner cube reflector is given as one example of the above member. A apparatus for inputting coordinates 100 is composed of a coordinate input plane 101 for inputting a coordinate position, an optical unit 102, a reflecting section 103, a support plate 104 for fixing the coordinate input plane 101, and a frame section 105 for reinforcing the support plate 104 and fixing the reflecting section 103. More specifically, the optical unit 102 has a light emitting section which emits light that is substantially parallel to the coordinate input plane 101 and a light receiving section which receives the light traveling substantially parallel to the coordinate input plane 101. The reflecting section 103 reflects the light emitted from the optical unit 102.

In FIG. 1A and FIG. 1B, legend 106 denotes an emission light mouth which is an outlet of light from the optical unit 102, and legend 107 denotes a screw for fixing the optical unit 102 to the frame section 105. Moreover, legend 108 denotes a pointing stick for inputting a coordinate position on the coordinate input plane 101. In this case, the point stick is used for shielding the light, and as shown in FIG. 1A, the coordinate position may be inputted by a finger or the like. The emission light mouth 106 is also an incident light mouth which is an inlet of light incident upon the optical unit 102. A legend 109 denotes a height adjusting screw for adjusting a height of the optical unit 102, and legend 110 denotes an optical unit retaining plate for retaining the optical unit.

Figure 2A:
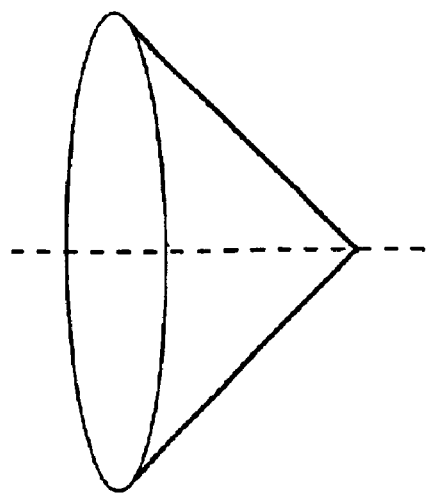
FIG. 2A and FIG. 2B are views showing a corner cube reflector.
Figure 2B:
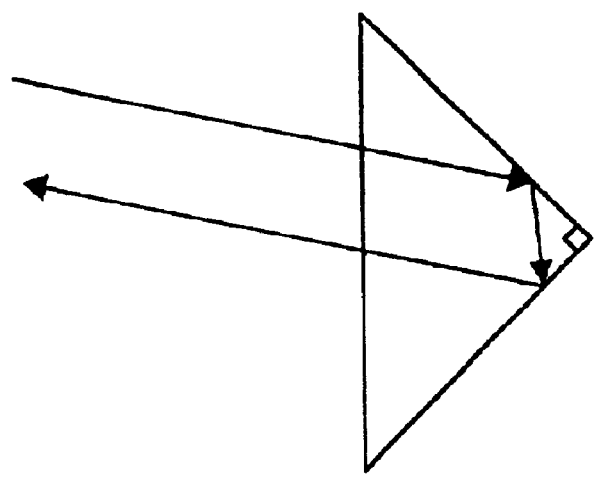

The reflecting section 103 has a surface which is covered with a member recursively reflecting the light. A corner cube reflector is give as one example of the above member. FIG. 2A and FIG. 2B are views showing the corner cube reflector. FIG. 2A is a perspective view showing the corner cube reflector, and FIG. 2B is a cross sectional view in a straight line passing through the vertex and the center of circle of a base. The corner cube reflector has a conical shape, and its inner surface is aluminized so as to improve a reflection efficiency. As shown in FIG. 2B, the corner cube reflector recursively reflects an incident light because its conical angle is 90°.

Figure 3A:
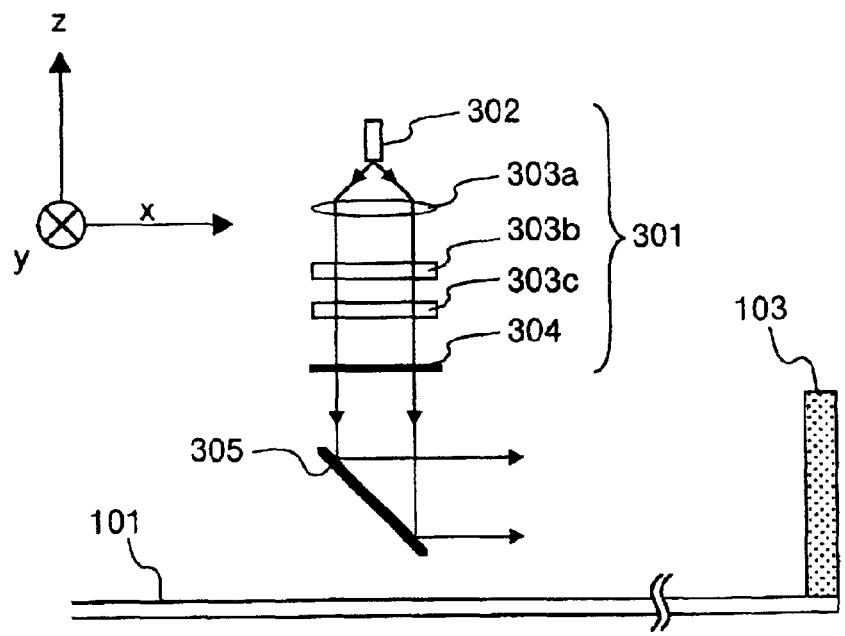
FIG. 3A and FIG. 3B are views schematically showing an internal structure of a light emitting section of an optical unit of the apparatus for inputting coordinates according to a first embodiment.
Figure 3B:
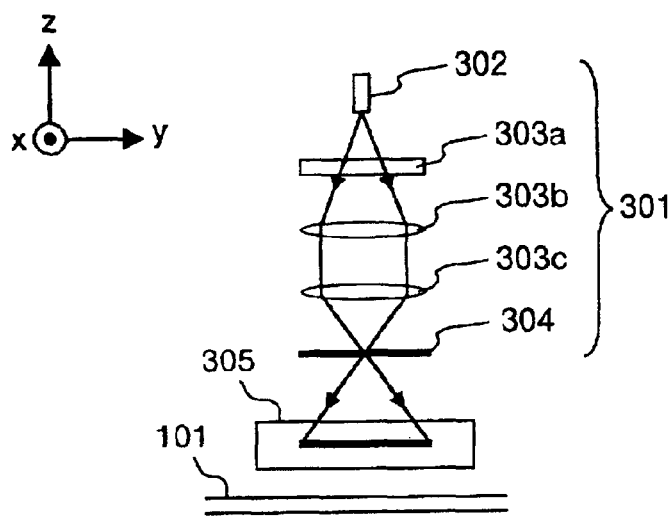

The following is a description on the optical unit 102. FIG. 3A and FIG. 3B are views schematically showing an internal structure of a light emitting section of the optical unit 102. FIG. 3A is a view showing the light emitting section when viewing it from a direction (y-axis direction in FIG. 3A and FIG. 3B) perpendicular to a traveling direction of irradiation light in a plane parallel to the coordinate input plane 101. FIG. 3B is a view showing the light emitting section when viewing it from a traveling direction of irradiation light direction (x-axis direction in FIG. 3A and FIG. 3B). The light emitting section 301 is composed of a light emitting element 302 emitting an irradiation light, cylindrical lenses 303a to 303c for deflecting the irradiation light emitted from the light emitting element to a predetermined direction, and a slit 304. In this case, a half-silvered mirror 305 is a half mirror for reflecting the irradiation light passing through the slit 304 toward the reflecting section 103.

For example, the light emitting element 302 comprises a laser diode, a pin-point LED or the like. The irradiation light emitted from the light emitting element 302 is converged by the cylindrical lens 303a, and then, is formed as the light parallel to the z-axis (see FIG. 3A). Subsequently, the irradiation light passes through two cylindrical lenses 303b and 303c, and then, is converged to the y-axis direction, and thereafter, is collected to the slit 304 (see FIG. 3B). The slit 304 is formed with a long and thin micro clearance extending parallel to the x-axis, and thereby, the irradiation light is expanded like a sector in the y-axis direction. Namely, the slit 304 forms a so-called linear light source so as to improve a uniformity of the irradiation light.

Figure 4:
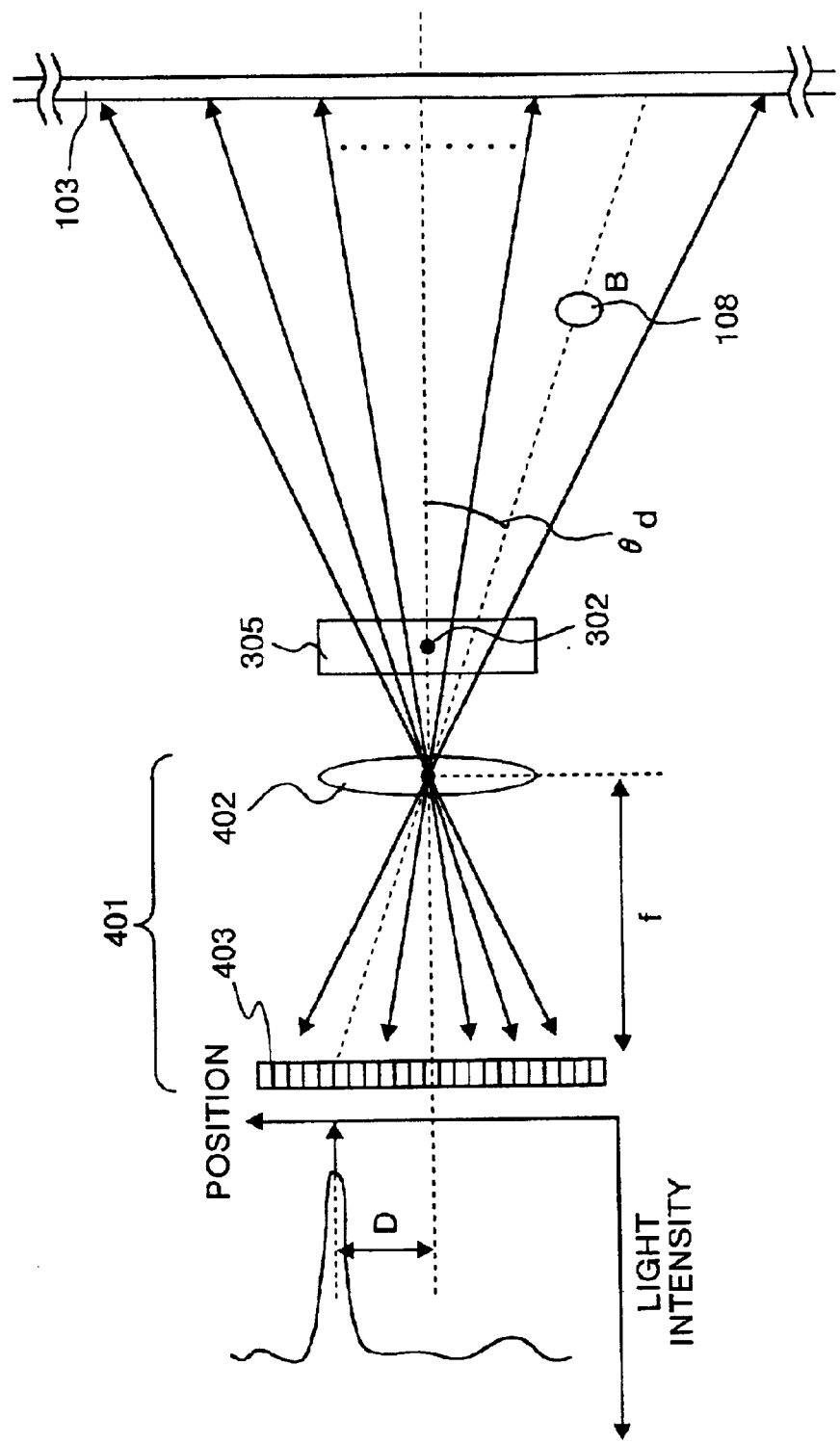
FIG. 4 is a view schematically showing an internal structure of a light receiving section of the optical unit of the apparatus for inputting coordinates according to the first embodiment when viewing from a direction vertical to a coordinate input plane.

FIG. 4 is a view schematically showing an internal structure of a light receiving section of the optical unit 102 when viewing it from a direction vertical to the coordinate input plane 101. For simplification of description, the following is a description on a detection of a reflection light in a two-dimensional plane parallel with the coordinate input plane 101. The light receiving section 401 is composed of a light receiving lens 402 for converging (collecting) a reflection light reflected by the reflecting section 103, and a line sensor 403 such as photo sensor, comprising a plurality of light receiving elements (optics) for sensing a receiving light intensity. Moreover, in FIG. 4, there are shown a light emitting element 302 and a half-silvered mirror 305.

In this case, the light emitting element 302 is situated above the half-silvered mirror 305 (at a position of z>0 in the coordinate system in FIG. 4; therefore, the light emitting element 302 is shown therein by a black-colored point. A light irradiated from the light emitting element 302 is reflected by the reflecting section 103, and then, a reflection light is returned along the same path. Subsequently, the reflection light arrives at different positions on the line sensor 403 by the light receiving lens 304.

Therefore, when the pointing stick 108 or finger is inserted into a certain position B on the coordinate input plane 101 and the irradiation light is shielded, the reflection light does not arrive at a point on the line sensor 403 corresponding to the shielded direction. In the case where no obstacle shielding light exist on the coordinate input plane 101, a receiving light distribution on the line sensor 403 becomes approximately constant in the symmetry with respect to the optical axis. However, as shown in FIG. 4, the pointing stick 108 or finger is inserted into a certain position B on the coordinate input plane 101, the light passing there through is shielded, and then, on the line sensor 403, a area (dark point) having a weak receiving light intensity is generated in a position D.

The above position D makes one-to-one correspondence with an angle of the shielded light, that is, a detection angle θd measured from the optical axis of the pointing stick 108, finger or the like. Therefore, if the position D of being a dark point on the line sensor 403 is found, θd can be seen. More specifically, assuming that a distance from the light receiving lens 402 to the line sensor 403 is set as f, θd is obtained as a function of D from the following equation (1).

$$\theta d = \arctan (D/f) \qquad (1)$$

In this case, strictly, a relation of $\tan(\theta d) = D/f$ is not established due to the light refraction by the light receiving lens 402. However, the relation between θd and D/f is uniquely determined; therefore, for simplification, it is assumed that the above equation (1) is formed. Further, the above optical axis denotes an optical axis of the light receiving lens 402. Furthermore, the emission light mouth 106 of the optical unit 102 is arranged parallel with the light receiving lens 402.

Figure 5:
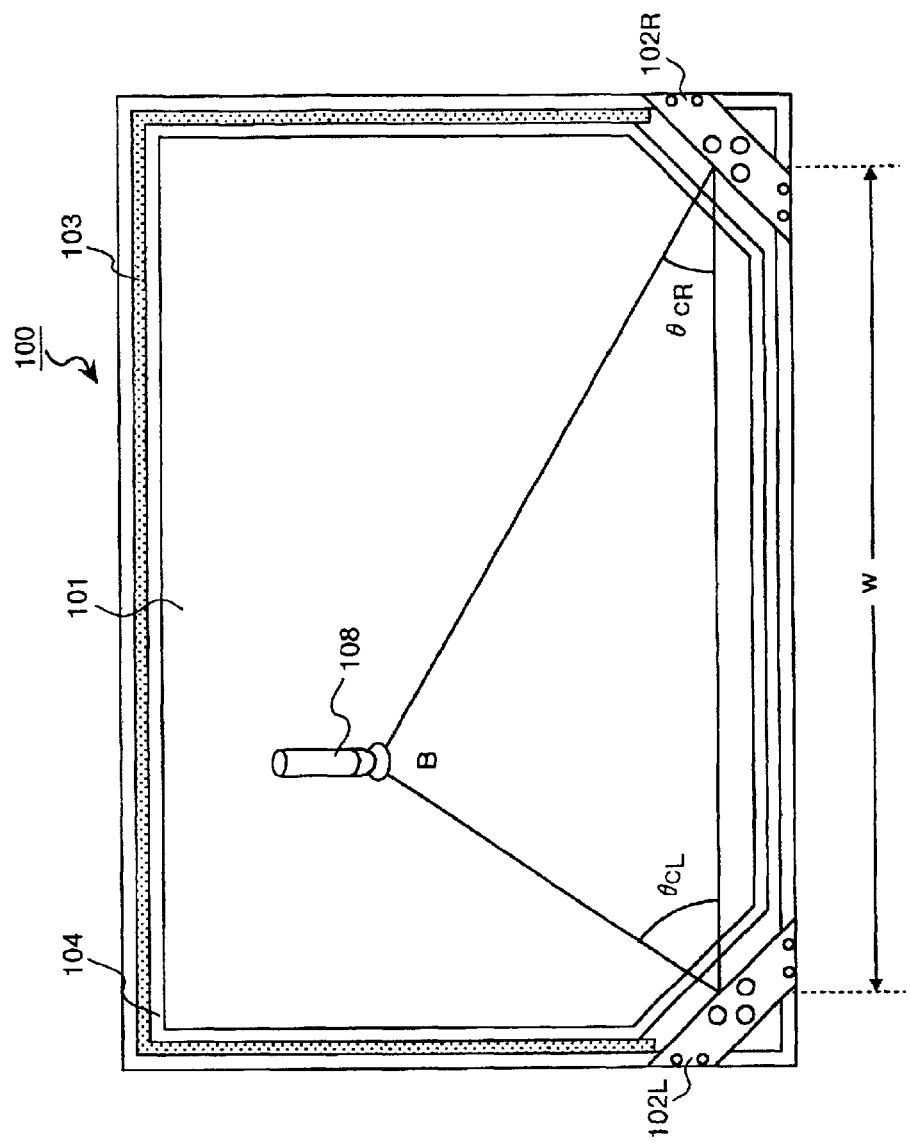
FIG. 5 is a view schematically showing a construction of the apparatus for inputting coordinates according to the first embodiment.

FIG. 5 is a view schematically showing the whole construction of an apparatus for inputting coordinates 100, and shows a coordinate point B, a distance w between the point B and the optical unit, and a relation between calculation angles θcR and θcL used for calculating the coordinate point B. In FIG. 5, the optical unit 102 is arranged at a position relevant to one corner portion of the rectangular coordinate input plane 101; therefore, there is no need of providing the reflecting section 103 arranged along one side of the rectangular coordinate input plane 101. Thereinafter, a capital letter L is used as an index for identifying various parameters employed in a left-side optical unit 102L; on the other hand, a capital letter R is used as an index for identifying various parameters employed in a right-side optical unit 102R. Although the detailed calculating process is omitted, the coordinate point B (x, y) is obtained from the following equation (2)

$$x=w\cdot\tan\theta cR/(\tan\theta cL+\tan\theta cR) \quad y=w\cdot\tan\theta cL\cdot\tan\theta cR/(\tan\theta cL+\tan\theta cR) \quad (2)$$

Therefore, if the position of the dark point on the line sensor 403 is found, a calculation angle θc is calculated on the basis of θd, and thereafter, the coordinate point is calculated by the above equation (2). The calculation is made by a computing section (not shown) in FIG. 1A and FIG. 1B. In this case, depending upon the situation, a PC (personal computer) is provided outside the apparatus for inputting coordinates 100, and then, the PC may calculate the above coordinate point.

In the apparatus for inputting coordinates 100, the emission light mouth 106 of the optical unit 102 is arranged so as to be situated under the coordinate input plane 101. In this case, the emission light mouth 106 is situated under the coordinate input plane 101 in order to reduce a convex portion with respect to the coordinate input plane of the optical unit 102 and the support plate 104. In the above manner, the emission light mouth 106 is arranged at a height position lower than the coordinate input plane 101, and thereby, it is possible to reduce a convex portion, that is, a projection of the optical unit 102. As a result, a user, who inputs a coordinate point, has no hindrance, and therefore, an availability is improved.

Moreover, in the optical unit 102, a height from the coordinate input plane 101 is adjustable by the height adjusting screw 109. Thus, an irradiation light is emitted just from the height of the coordinate input plane 101 by the height adjusting screw 109. Therefore, it is possible to make the correspondence of the position of the pointing stick 108 of the coordinate input plane 101 or finger with the position of irradiation light contacting with the pointing stick or finger. Further, it is possible to improve a detection accuracy in a predetermined area causing a large error in the prior art. In this case, the height adjusting screw 109 is provided at three portions on the optical unit retaining plate 110, and thereby, it is possible to adjust a distortion of a sector irradiation light.

Figure 6:
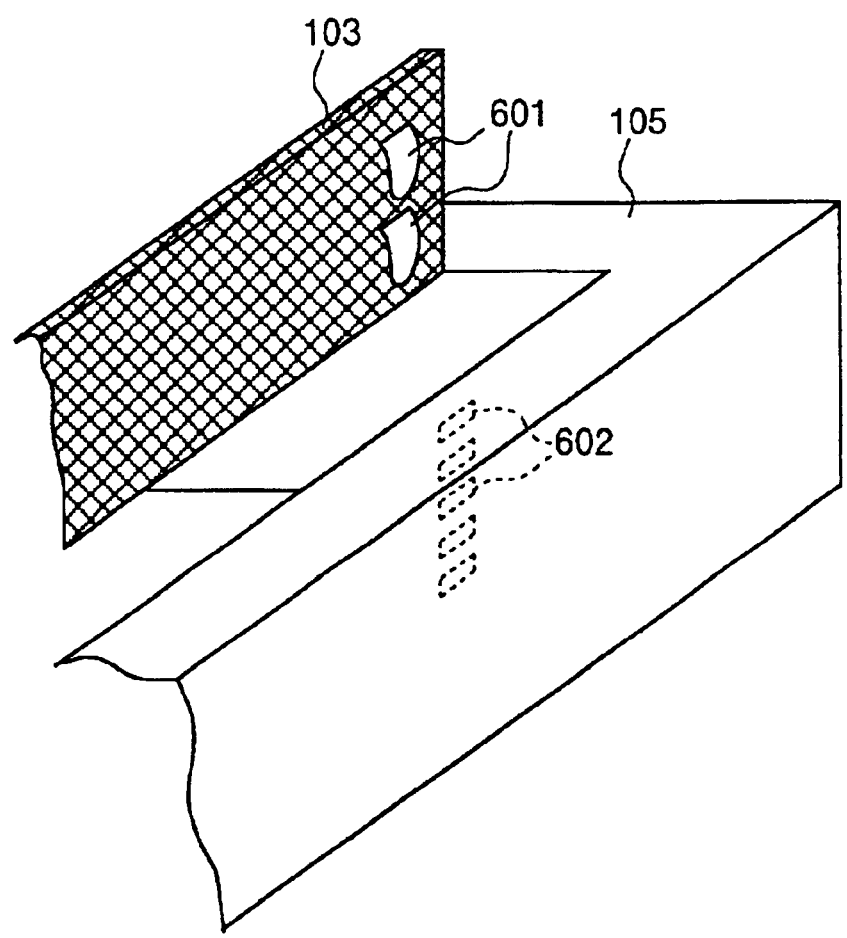
FIG. 6 is a view to explain one example of adjusting a height of a reflecting section of the apparatus for inputting coordinates according to the first embodiment.

As described above, the height of the optical unit 102 is adjustable, and in the same manner, it is possible to adjust a height of the reflecting section 103 from the coordinate input plane 101. FIG. 6 is a view to explain one example of adjusting the height of the reflecting section 103. The reflecting section 103 is provided with an engaging hook 601, and the frame 105 is formed with a plurality of holes 602 into which the engaging hook 601 is fitted. The hole 602 is properly selected, and thereby, it is possible to adjust the height of the reflecting section 103. In this case, this embodiment is not limited to the engaging hook 601. The reflecting section 103 is provided with a screw; on the other hand, the frame 105 is formed with a screw hole, and thereby, the height of the reflecting section 103 may be adjusted.

In the above manner, the height of the reflecting section 103 is adjusted, and thereby, it is possible to reduce a projection from a circumferential edge of the apparatus for inputting coordinates 100. As a result, a user, who inputs a coordinate point, has no hindrance, and therefore, an availability is improved. Moreover, the height of the reflecting section 103 is made low; therefore, it is possible to improve a visibility of a person who views the apparatus for inputting coordinates 100 from an oblique direction.

Figure 7:
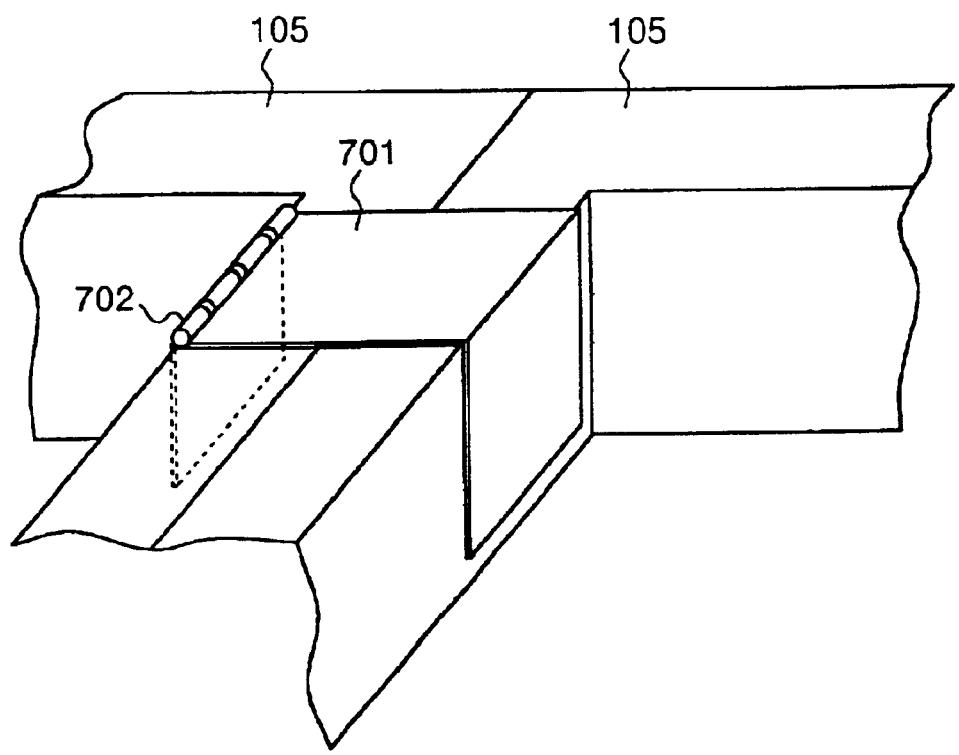
FIG. 7 is a view to explain one example of a joint member for joining a frame section of the apparatus for inputting coordinates according to the first embodiment to a frame section of another apparatus for inputting coordinates.

An end portion of the frame 105 is provided with a joint member so as to be joined together with a frame of another apparatus for inputting coordinates. FIG. 7 is a view to explain one example of a joint member for joining a frame of another apparatus for inputting coordinates. As seen from FIG. 7, a joint member 701 is attached to the end portion of the frame 105, and has a U-letter shape so as to be joined together with a frame of another apparatus for inputting coordinates. In the case of making no joint together with a frame of another apparatus for inputting coordinates, the joint member is folded by a hinge 702. The joint member is not limited to the U-letter shaped joint member, and a screw and a screw hole may be used in accordance with embodiments.

The joint member as described above is used, and thereby, a plurality of apparatuses for inputting coordinates is combined so as to secure a wide coordinate input plane. For example, an availability can be improved in the case of using the apparatus for inputting coordinates in a large conference hall or the like. In particular, the height of the optical unit 102 is made low by using the height adjusting screw 109 (see FIG. 1A and FIG. 1B), and simultaneously, the height of the reflecting section 103 is made low by using the engaging hook 601 (see FIG. 6). By doing so, even in the case where a plurality of apparatuses for inputting coordinates is combined, it is possible to improve a visibility of a user who views the coordinate input plane 101 from an oblique direction.

Figure 8A:
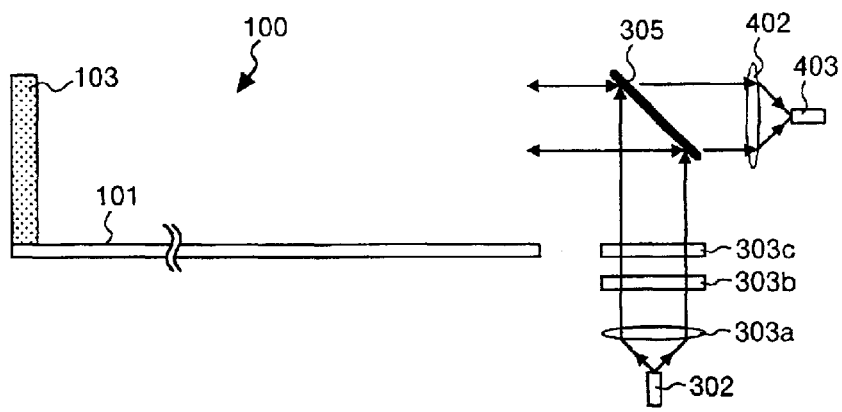
FIG. 8A and FIG. 8B are views showing another arrangement of the light emitting section and the light receiving section of the apparatus for inputting coordinates according to the first embodiment.
Figure 8B:
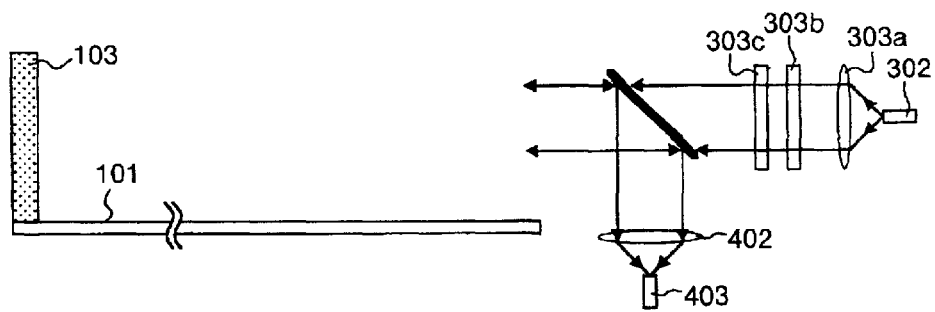

The light emitting section 301 shown in FIG. 3A and FIG. 3B is arranged above the coordinate input plane 101, that is, on the side inputting a coordinate, and therefore, the light receiving section 401 is arranged on a position receiving the light traveling substantially parallel to the coordinate input plane 101. However, the light emitting section 301 and the light receiving section 401 are not limited to the arrangement as described above. For example, as shown in FIG. 8A and FIG. 8B, either of the light emitting section 301 and the light receiving section 401 may be arranged below the apparatus for inputting coordinates. By doing so, it is possible to reduce irregularities on the surface of the apparatus for inputting coordinates 100, and thus, to improve a user's operability.

Figure 9A:
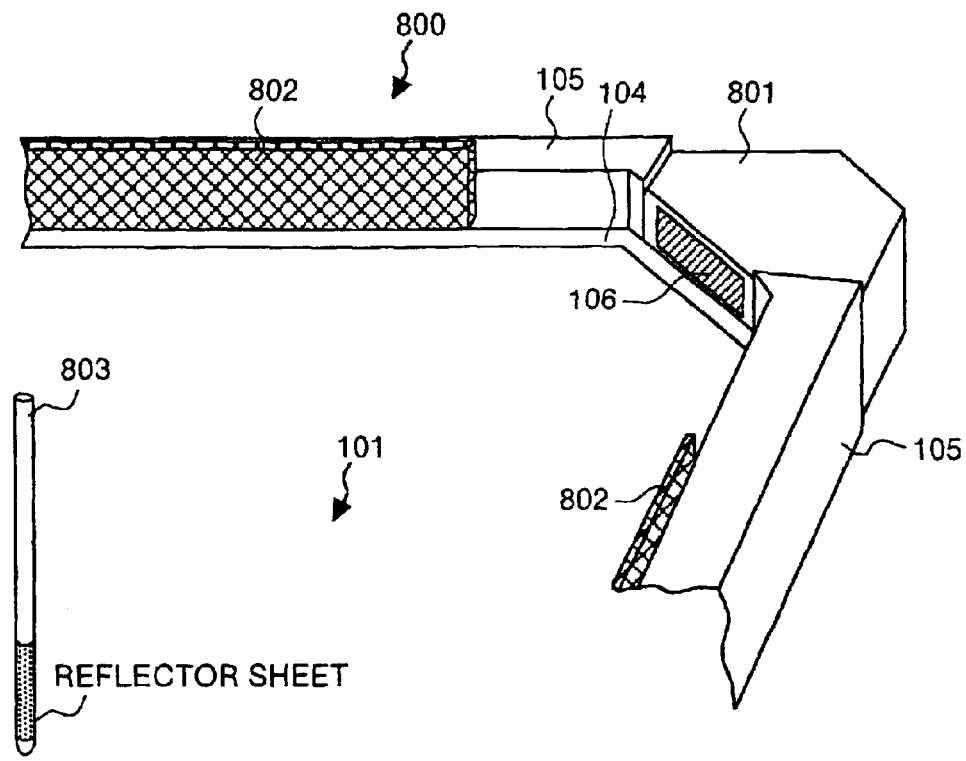
FIG. 9A and FIG. 9B are views schematically showing a corner portion including an optical unit of an apparatus for inputting coordinates of to a second embodiment.
Figure 9B:
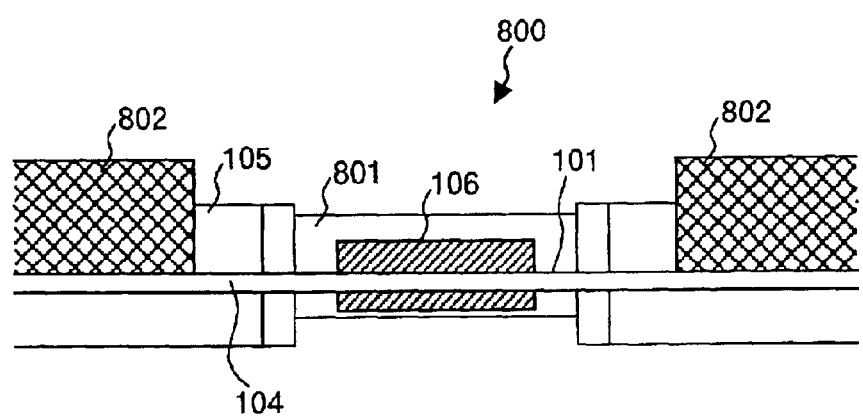

The following is a description on an apparatus for inputting coordinates of this second embodiment, which calculates a coordinate point by sensing a direction of irradiation light reflected by the pointing stick. In this second embodiment, identical legends are used to designate the same constituent parts as the above first embodiment and the details are omitted. FIG. 9A and FIG. 9B are views schematically showing a corner portion including an optical unit of the apparatus for inputting coordinates which senses a direction of irradiation light reflected by the pointing stick. FIG. 9A is a perspective view of the apparatus for inputting coordinates, and FIG. 9B is a front view showing the optical unit when viewing it from a light emitting side.

A apparatus for inputting coordinates 800 is composed of a coordinate input plane 101 for inputting a coordinate position, an optical unit 801, a shielding plate 802, a support plate 104 for fixing the coordinate input plane 101, and a frame section 105 for reinforcing the support plate 104 and fixing the shielding plate 802. More specifically, the optical unit 802 has a light emitting section which emits light that is substantially parallel to the coordinate input plane 101 and a light receiving section which receives the light traveling substantially parallel to the coordinate input plane 101. The shielding plate 802 absorbs the light emitted from the optical unit 801, and shields the light from the outside.

In FIG. 9A and FIG. 9B, legend 106 denotes an emission light mouth which is an outlet of light from the optical unit 801, and legend 803 denotes a pointing stick for inputting a coordinate position on the coordinate input plane 101. In this case, the point stick 803 is attached with a sheet-like retro-reflector at its distal end portion. The retro-reflector reflects the light irradiated from the optical unit 801. The emission light mouth 106 is also an incident light mouth which is an inlet for receiving the light from the optical unit 801.

The shielding plate 802 is covered with a material absorbing light at its surface. For example, a black colored felt cloth or the like is given as the material. The above material is used, and thereby, it is possible to absorb the light irradiated from the optical unit 801, and to relatively improve a sensitivity of the light receiving section of the optical unit 801 with respect to the irradiation light reflected by the pointing stick 803.

Figure 10A:
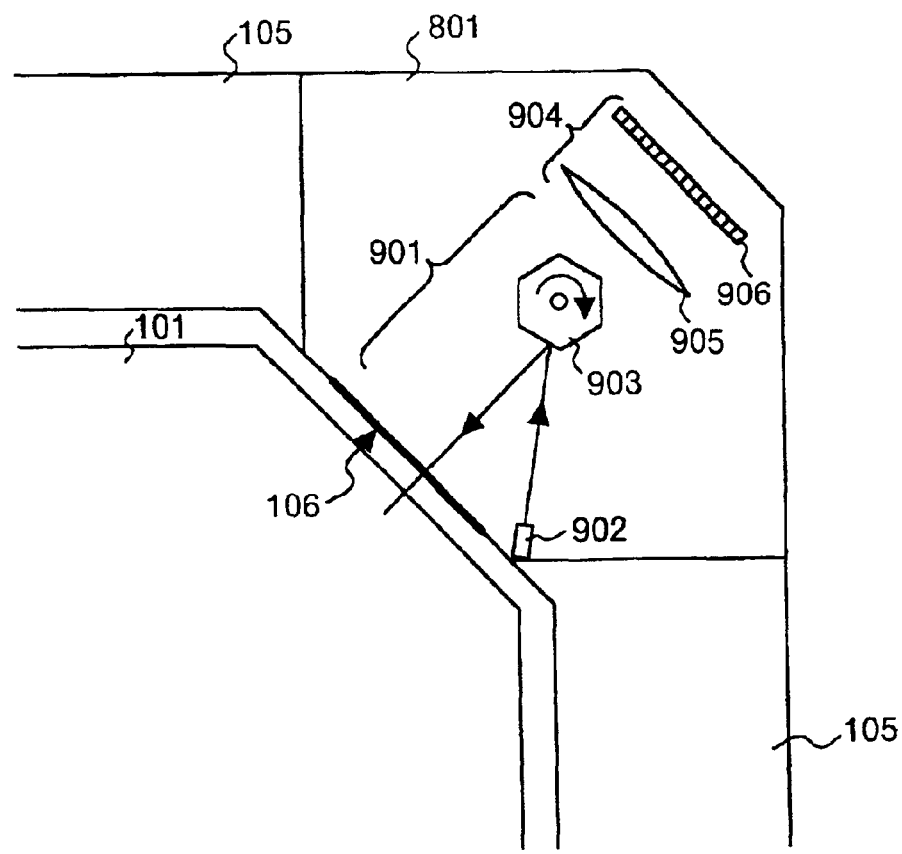
FIG. 10A and FIG. 10B are views schematically showing an internal structure of the optical unit of the apparatus for inputting coordinates according to the second embodiment.
Figure 10B:
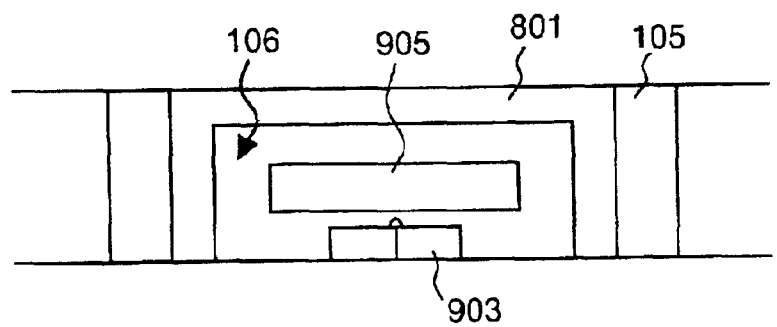

Next, the following is a detailed description on a light receiving section and a light emitting section of the optical unit 801. FIG. 10A and FIG. 10B are views schematically showing an internal structure of the optical unit 801. FIG. 10A is a view when viewing the inside of the optical unit 801 from a direction vertically parallel with the coordinate input plane 101, and FIG. 10B is a view when viewing the optical unit 801 from a direction of the emission light mouth 106. A light emitting section 901 is composed of a light emitting element 902 which emits a beam irradiation light, and a polygon mirror 903 which reflects an irradiation light emitted from the light emitting element 902 so as to optically scan the coordinate input plane 101. Moreover, the light receiving section 904 is composed of a cylindrical lens 905 for converging an irradiation light reflected by the pointing stick 803, and a line sensor 906 which senses a direction of the pointing stick 803 by light converged by the cylindrical lens 905.

In the apparatus for inputting coordinates 800, the optical unit 801 is embedded in a corner portion of the frame 105; therefore, it is possible to further reduce irregularities as compared with the apparatus for inputting coordinates 100 of the above first embodiment. As a result, a user, who inputs a coordinate point, has no hindrance, and therefore, an availability is improved.

Moreover, a mounting position of the optical unit 801 is variable with respect to the frame 105, and thereby, the height of the optical unit 801 is adjustable. In order to adjust the height of the optical unit 801, the engaging hook as shown in FIG. 6 may be provided, or the position may be adjusted by using a screw. The mounting position is variable, and thereby, a height of irradiation light from the coordinate input plane 101 is adjustable. As a result, it is possible to improve a detection accuracy in a predetermined area causing a large error in the prior art.

Moreover, the shielding plate 802 may be adjusted in its height as shown in FIG. 6. The height of the shielding plate 802 is adjusted, and thereby, a visibility is improved in the coordinate input plane 101. In addition, the apparatus for inputting coordinates 800 may be joined together with another apparatus for inputting coordinates by using the same member as the joint member 701 shown in FIG. 7. By doing so, it is possible to form a wide coordinate input plane. Further, the height of the shielding plate is made low, and thereby, a visibility can be improved.

Figure 11:
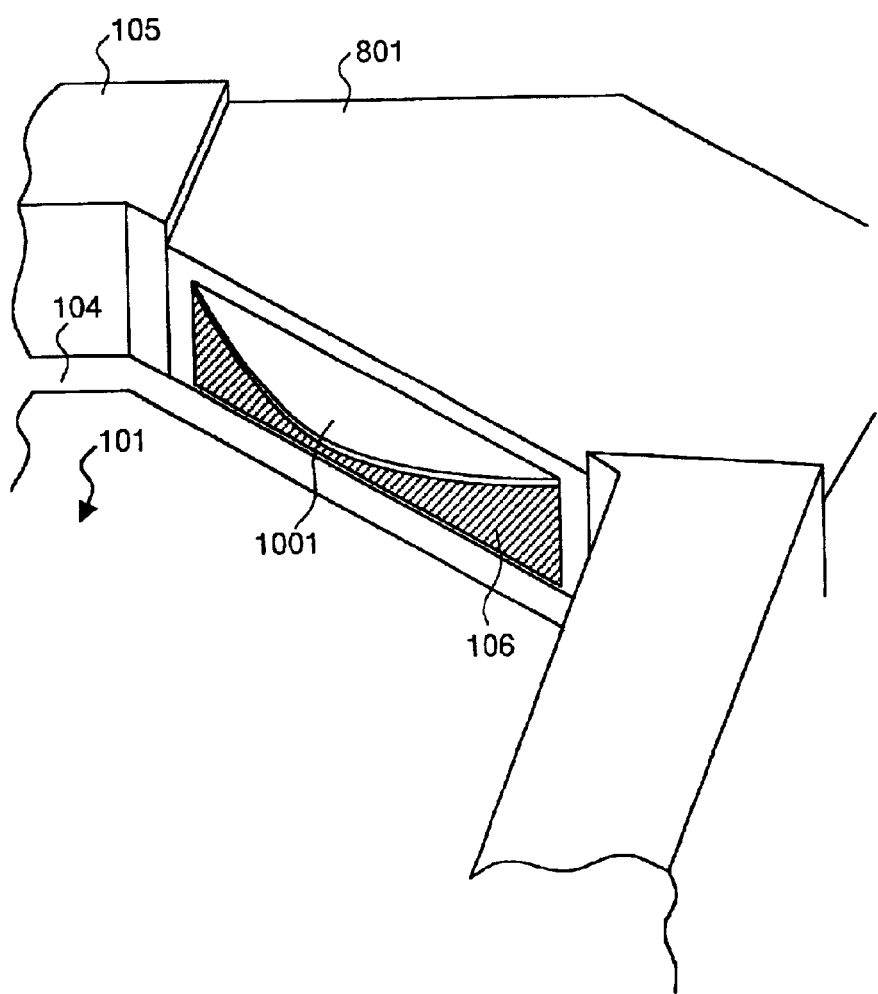
FIG. 11 is a view to explain a shielding plate attached to the optical unit of the apparatus for inputting coordinates according to the second embodiment.
Figure 12A:
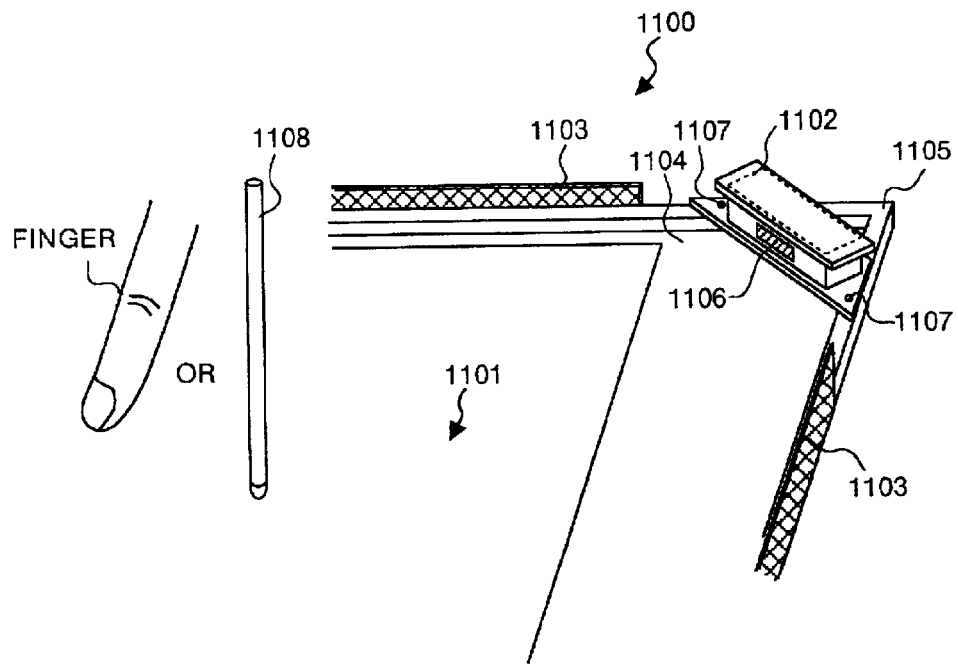
FIG. 12A and FIG. 12B are views schematically showing a corner portion including an optical unit of a conventional apparatus for inputting coordinates.
Figure 12B:
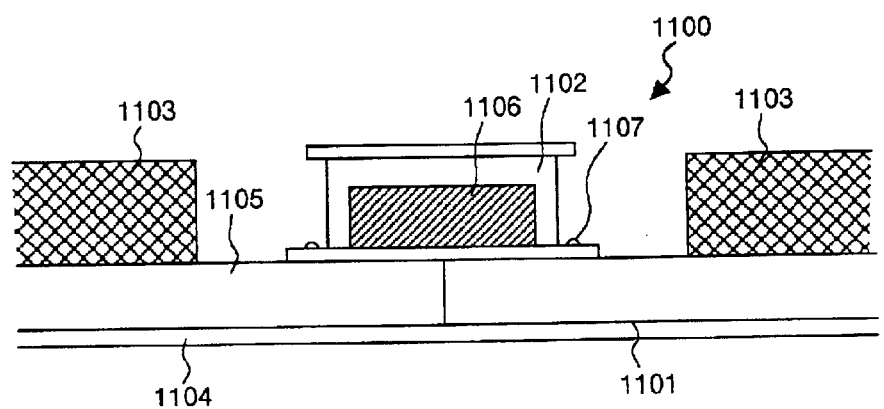
Figure 13A:
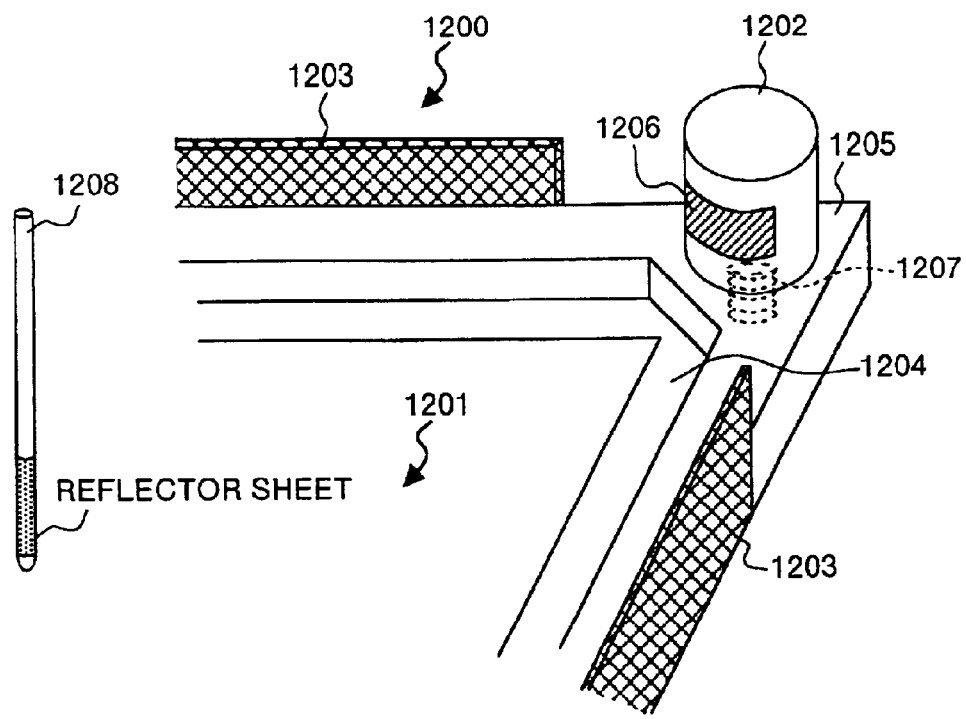
FIG. 13A and FIG. 13B are views schematically showing another conventional optical type apparatus for inputting coordinates.
Figure 13B:
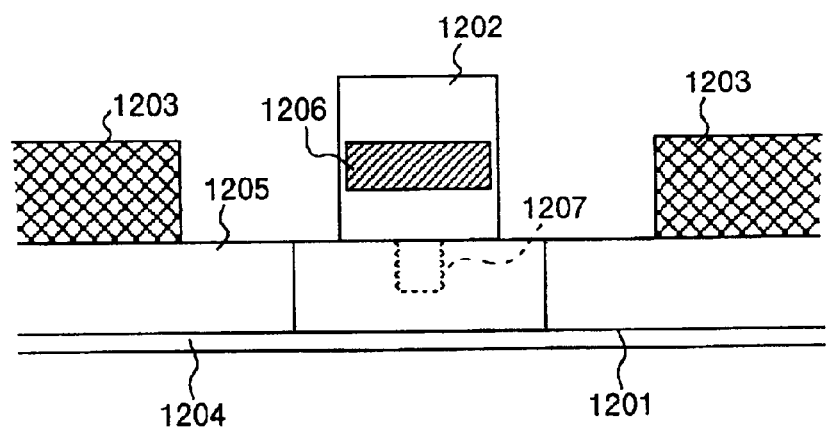
Figure 14A:
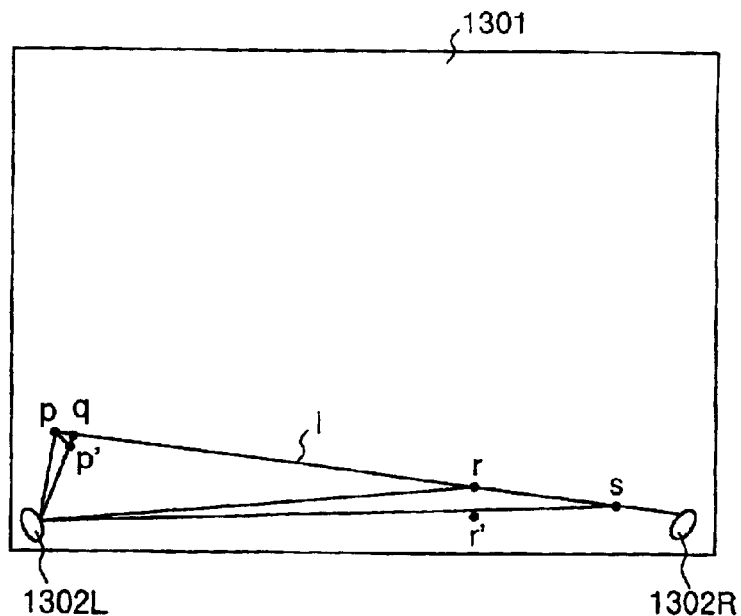
FIG. 14A, FIG. 14B, and FIG. 14C are views showing an area where a detection accuracy is reduced in the conventional optical type apparatus for inputting coordinates, and to explain the principle.
Figure 14B:
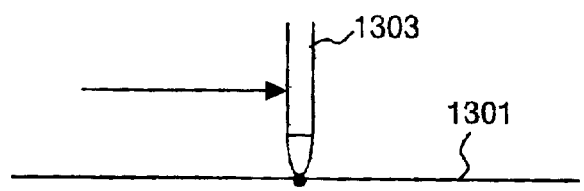
Figure 14C:
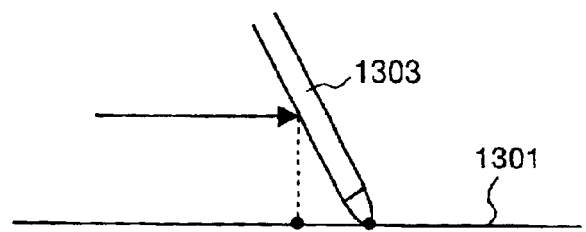
Figure 15A:
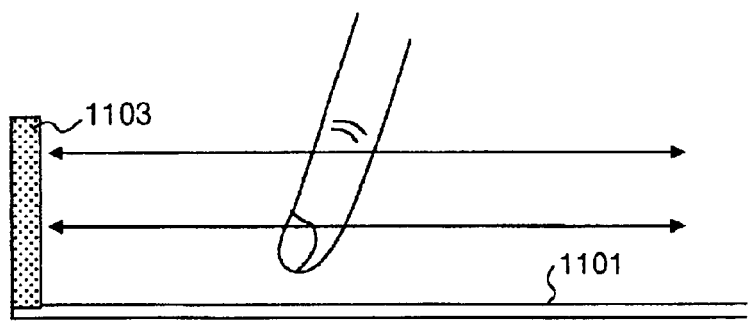
FIG. 15A and FIG. 15B are views to explain the principle that "unnecessary character locus" occurs in the case where an irradiation light portion is higher than a coordinate input plane in the conventional optical type apparatus for inputting coordinates.
Figure 15B:
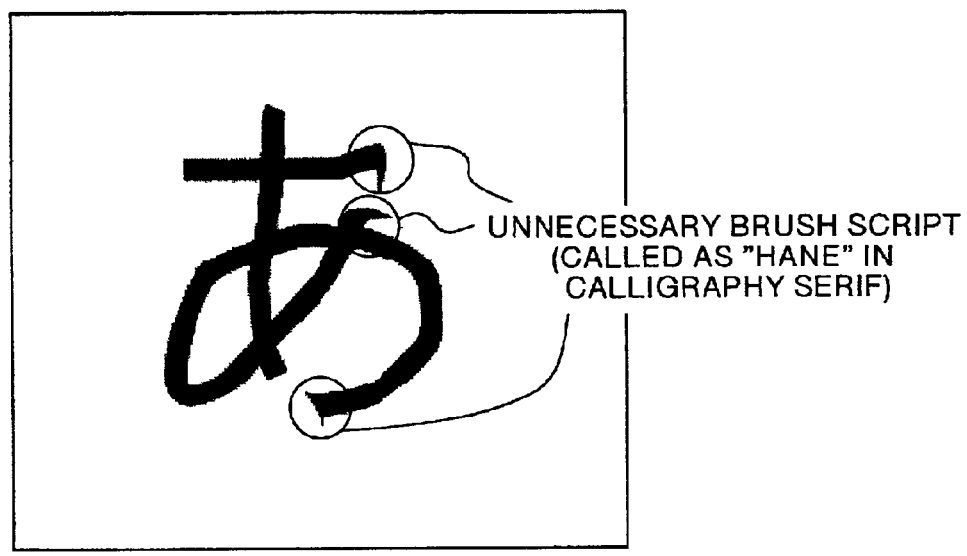
Figure 16A:
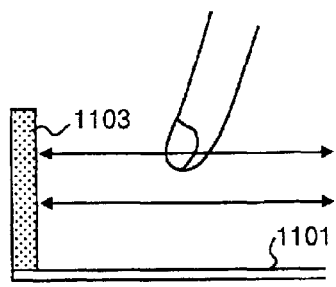
FIG. 16A to FIG. 16F are views to explain the principle that "faintness" occurs in the case where an irradiation light portion is higher than a coordinate input plane in the conventional optical type apparatus for inputting coordinates.
Figure 16B:
Figure 16C:
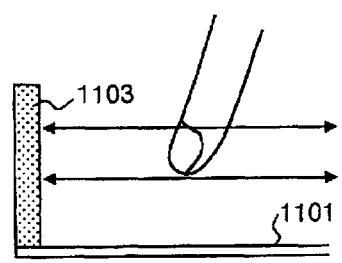
Figure 16D:
Figure 16E:
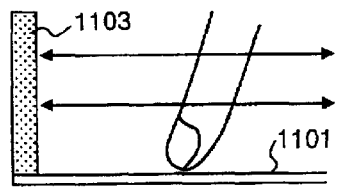
Figure 16F:
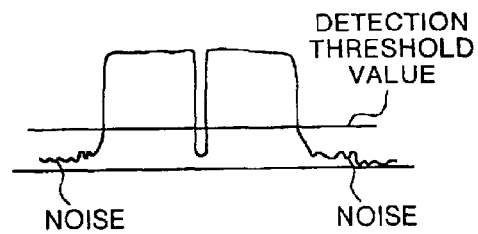

The apparatus for inputting coordinates 800 shields the light from the outside, and thereby, a detection accuracy can be improved. FIG. 11 is a view to explain a shielding plate provided in the optical unit 801. As shown in FIG. 11, a shielding plate 1001 is provided at an upper portion of the emission light mouth 106 of the optical unit 801. The shielding plate 1001 is provided as described above, and thereby, the light from the outside is shielded. Therefore, light received by the optical unit 801 is limited to the light from the pointing stick 803; as a result, it is possible to accurately detect a coordinate position. In FIG. 11, the shielding plate has been formed into a circular-arc shape. The shielding plate is not limited to the above shape, and may be formed into a rectangular shape or the like. Moreover, the shielding plate 1001 is received in the optical unit 801, and thereby, it is possible to reduce a space of the optical unit 801.

As is evident from the above description, according to apparatus for inputting coordinates of this invention, a projection of the optical unit is reduced. As a result, it becomes easy to operate the apparatus for inputting coordinates.

Further, since the height of the light is adjustable, it is possible to make close a position of the pointing means such as the finger or the pointing stick with respect to the coordinate input plane and a position of light irradiated to the pointing means. As a result, the apparatus for inputting coordinates can detect the coordinates more accurately.

Further, since the height of the reflecting section is adjustable, a projection of the reflecting section is reduced. As a result, the reflecting section does not block the view of the user.

Further, since the apparatus for inputting coordinates can be coupled with another apparatus for inputting coordinates, it is possible to reduce irregularities of portion where the apparatuses for inputting coordinates are coupled with each other. In addition, even if a plurality of apparatuses for inputting coordinates is connected to each other, it is possible to improve operability and visibility.

Further, since a plane including the coordinate input plane is interposed between the light source sections the light receiving section, the light source section or the light receiving section is arranged on the side opposite to the coordinate input plane. As a result, it is possible to reduce a projection on the coordinate input plane side, and improve the operability.

The present document incorporates by reference the entire contents of Japanese priority documents, 2000-074260 filed in Japan on Mar. 16, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for inputting coordinates, the apparatus comprising:
   a coordinate input plate including a coordinate input plane for inputting a coordinate position;
   a light source section which emits light that is substantially parallel to the coordinate input plane;
   a reflecting section which reflects the light emitted from the light source section; and
   a light receiving section which receives the light reflected by the reflecting section,
   wherein the light source section and the light receiving section are integrated to form a single optical unit, and this optical unit is embedded in the coordinate input plate.

2. The apparatus for inputting coordinates according to claim 1 further comprising an irradiation height adjusting unit which adjusts a height, from the coordinate input plane, of light emitted from the light source.

3. The apparatus for inputting coordinates according to claim 2 further comprising a reflection height adjusting unit which adjusts a height, from the coordinate input plane, of the reflecting section.

4. The apparatus for inputting coordinates according to claim 3 further comprising a coupling unit through which the apparatus for inputting coordinates can be coupled with another apparatus for inputting coordinates.

5. The apparatus for inputting coordinates according to claim 1, wherein a plane including the coordinate input plane is interposed between the light source sections the light receiving section.

6. An apparatus for inputting coordinates, the apparatus comprising:
   a coordinate input plate including a coordinate input plane for inputting a coordinate position;
   a light source section which emits light that is substantially parallel to the coordinate input plane;
   a pointing stick which reflects the light emitted from the light source section; and
   a light receiving section which receives the light reflected by the pointing stick,
   wherein the light source section and the light receiving section are integrated to form a single optical unit, and this optical unit is embedded in the coordinate input plate.

7. The apparatus for inputting coordinates according to claim 6 further comprising an emission light mouth, which is an outlet of light with respect to the coordinate input plane, provided with a shielding plate substantially parallel to the coordinate input plane.

8. The apparatus for inputting coordinates according to claim 6 further comprising an irradiation height adjusting unit which adjusts a height, from the coordinate input plane, of light emitted from the light source.

9. The apparatus for inputting coordinates according to claim 6 further comprising a shielding plate extending substantially vertical to the coordinate input plane at an outer edge of the coordinate input plane.

10. The apparatus for inputting coordinates according to claim 9 further comprising a shielding height adjusting unit which adjusts the height, from the coordinate input plane, of the shielding plate.

11. The apparatus for inputting coordinates according to claim 10 further comprising a coupling unit through which the apparatus for inputting coordinates can be coupled with another apparatus for inputting coordinates.

12. An apparatus for inputting coordinates, the apparatus comprising:
   a coordinate input plate including a coordinate input plane for inputting a coordinate position;
   a light source means for emitting light that is substantially parallel to the coordinate input plane;
   a reflecting means for reflecting the light emitted from the light source means; and
   a light receiving means for receiving the light reflected by the reflecting means,
   wherein the light source means and the light receiving means are integrated to form a single optical means, and this optical means is embedded in the coordinate input plate.

13. The apparatus for inputting coordinates according to claim 12 further comprising an irradiation height adjusting means for adjusting a height, from the coordinate input plane, of light emitted from the light source.

14. The apparatus for inputting coordinates according to claim 13 further comprising a reflection height adjusting means for adjusting a height, from the coordinate input plane, of the reflecting means.

15. The apparatus for inputting coordinates according to claim 14 further comprising a coupling means through which the apparatus for inputting coordinates can be coupled with another apparatus for inputting coordinates.

16. The apparatus for inputting coordinates according to claim 12, wherein a plane including the coordinate input plane is interposed between the light source sections the light receiving section.

17. An apparatus for inputting coordinates, the apparatus comprising:
   a coordinate input plate including a coordinate input plane for inputting a coordinate position;
   a light source means for emitting light that is substantially parallel to the coordinate input plane;
   a pointing stick means for reflecting the light emitted from the light source means; and
   a light receiving means for receiving the light reflected by the pointing stick means,
   wherein the light source means and the light receiving means are integrated to form a single optical means, and this optical means is embedded in the coordinate input plate.

18. The apparatus for inputting coordinates according to claim 17 further comprising an emission light mouth, which is an outlet of light with respect to the coordinate input plane, provided with a shielding plate substantially parallel to the coordinate input plane.

19. The apparatus for inputting coordinates according to claim 17 further comprising an irradiation height adjusting means for adjusting a height, from the coordinate input plane, of light emitted from the light source.

20. The apparatus for inputting coordinates according to claim 17 further comprising a shielding plate extending substantially vertical to the coordinate input plane at an outer edge of the coordinate input plane.

21. The apparatus for inputting coordinates according to claim 20 further comprising a shielding height adjusting means for adjusting the height, from the coordinate input plane, of the shielding plate.

22. The apparatus for inputting coordinates according to claim 21 further comprising a coupling means through which the apparatus for inputting coordinates can be coupled with another apparatus for inputting coordinates.

* * * * *